United States Patent [19]

Kitabatake

[11] Patent Number: 5,469,474
[45] Date of Patent: Nov. 21, 1995

[54] QUANTIZATION BIT NUMBER ALLOCATION BY FIRST SELECTING A SUBBAND SIGNAL HAVING A MAXIMUM OF SIGNAL TO MASK RATIOS IN AN INPUT SIGNAL

[75] Inventor: Osamu Kitabatake, Tokyo, Japan

[73] Assignee: NEC Corporation, Tokyo, Japan

[21] Appl. No.: 80,766

[22] Filed: Jun. 24, 1993

[30] Foreign Application Priority Data

Jun. 24, 1992 [JP] Japan ................................. 4-165177

[51] Int. Cl.$^6$ .............................. H04B 14/04; H04B 1/66
[52] U.S. Cl. ....................... 375/243; 375/240; 395/2.38
[58] Field of Search ................................ 375/243, 254, 375/240, 242, 244; 395/2.38; 381/29, 36, 31; 341/143

[56] References Cited

U.S. PATENT DOCUMENTS

| | | | |
|---|---|---|---|
| 4,538,234 | 8/1985 | Honda et al. | 395/2.38 |
| 5,285,476 | 2/1994 | Akagiri et al. | 375/122 |

*Primary Examiner*—Stephen Chin
*Assistant Examiner*—Hai H. Phan
*Attorney, Agent, or Firm*—Foley & Lardner

[57] ABSTRACT

As a selected subband signal, selected is one of frequency band signals of an input signal that has a maximal signal to mask ratio. The selected subband signal is assigned, as a primary provisional bit number, with a maximal quantization bit number allocatable thereto. A primary mask to noise ratio of the selected subband signal is calculated. Other subband signals are assigned with temporary bit numbers incremented one by one from zero with secondary mask to noise ratios of the other subband signal meanwhile calculated each time when the temporary bit numbers are incremented by one. The temporary bit numbers are allocated to the other subband signals as secondary provisional bit numbers when the secondary mask to noise ratios individually exceed the primary mask to noise ratio. Some of the secondary provisional bit numbers may be equal to zero. A sum of the primary and the secondary provisional bit numbers is compared with a total of quantization bit numbers allocatable to the frequency band signals. If the sum does not exceed the total, the primary and the secondary provisional bit numbers are allocated to the selected and the other subband signals. If the sum exceeds the total, the primary and the secondary provisional bit numbers are uniformly reduced and allocated, unless reduced to negative, to the selected and the other subband signals. Zero is used instead of at least one of the secondary provisional bit numbers that is reduced to negative.

5 Claims, 3 Drawing Sheets

QUANTIZATION BIT NUMBER ALLOCATION BY FIRST SELECTING A SUBBAND SIGNAL HAVING A MAXIMUM OF SIGNAL TO MASK RATIOS IN AN INPUT SIGNAL

BACKGROUND OF THE INVENTION

This invention relates to the allocation of optimal quantization bit numbers to a plurality of frequency band or subband signals of an input signal. Such optimal quantization bit number allocation is indispensable for encoding the input signal into an encoded signal for transmission to a receiving side through a transmission channel at a certain bit rate.

In a manner which will later be described in greater detail, optimal quantization bit numbers are allocated or assigned to an input signal which is typically an audio input signal. More particularly, the optimal quantization bit numbers are allocated to the first through I-th frequency band signals B(1) to B(I) of the input signal and in accordance with the frequency bands of the input signal. Each frequency band signal B(i) (i being a variable between 1 and I, both inclusive of an input signal) is assigned quantization bits of an optimal quantization bit number which is specific to the frequency band signal under consideration. The optimal quantization bit number may be equal to zero depending on the frequency band signal in question.

It may be noted here that it is possible to preliminarily calculate a maximal quantization bit number which is individually allocatable to the frequency band signals B (suffixes omitted). Similarly, it is possible to calculate a total of quantization bit numbers allocatable to the frequency band signals. The total of quantization bit numbers depends on the bit rate at which the quantization bits representative of the frequency band signals are transmitted. Before being quantized into the quantization bits of the optimal quantization bit numbers, the frequency band signals are sampled at a preselected sampling rate. The total of quantization bit numbers depends furthermore on the sampling rate.

In each of the frequency bands, the frequency band signal has a maximal signal level and a mask level. The encoded signal is accompanied by quantization noise, which depends on the frequency bands and may be referred to simply as noise.

First, attention is directed to each of the frequency band signals. A signal to mask ratio (SMR), namely, a ratio of the maximal signal level to the mask level, is calculated. A mask to noise ratio (MNR) is calculated by subtracting the signal to mask ratio from a signal to noise ratio (SNR).

Next, all available frequency band or subband signals are taken into consideration. A minimum of the mask to noise ratios of the available subband signals is searched for. A subband signal Bmin, that has the minimal mask to noise ratio is selected from one of the available subband signals.

Subsequently, a temporary quantization bit number Na is allocated to the selected subband signal. The temporary quantization bit number Na is compared to the maximal quantization bit number Nmax which is allocatable to the selected subband signal. The maximal quantization bit number Nmax is preliminarily calculated. If the temporary quantization bit number Na is less than the maximal quantization bit number Nmax, Then temporary quantization bit number Na is incremented by one. In this manner, an already allocated quantization bit number is assigned to the selected subband signal.

A sum of such already allocated quantization bit numbers is calculated in connection with the available subband signals and is compared to the total of quantization bit numbers. The total of quantization bit numbers is preliminarily calculated as regards the quantization bit numbers allocatable to the frequency band signals. If the sum of the already calculated bit numbers is less than the total of quantization bit numbers, then the above-described steps are repeated in loops with the temporary quantization bit number compared to the maximal quantization bit number in each loop.

When the temporary quantization bit number reaches the maximal quantization bit number in a particular loop, the selected subband signal is excluded from the available subband signals to leave one less remaining new available subband signal than the number of available subband signals used in the particular loop. A new subband signal having a minimum mask to noise ratio is selected from the new available subband signals. The loops are repeated for the new selected subband signal and the new available subband signals.

In this manner, the loops are iterated until the sum of already allocated quantization bit numbers becomes equal to the total of quantization bit numbers. The optimal quantization bit numbers are eventually allocated to the frequency band signals.

According to a conventional quantization bit number allocation method, the loops must be iterated a plurality of times and are substantially equal in number to the total of the quantization bit numbers allocatable to the frequency band signals. As a consequence, a very long computer processing time has been necessary to allocate the optimal quantization bit numbers to the frequency band signals. A long computer processing time has been necessary when dealing with the high efficiency encoding of an input signal into an encoded signal of the optimal quantization bit numbers of a total of quantization bit numbers is increased in compliance with an increased rate.

SUMMARY OF THE INVENTION

It is consequently an object of the present invention to provide an improved method of allocating optimal quantization bit numbers to a plurality of frequency band signals into which an input signal is divided.

it is another object of this invention to provide an improved quantization bit number allocating method which is of the type described and in which the iteration of loops is avoided.

It is a further object of this invention to provide a quantization bit number allocating device for carrying out the improved method of the type described.

Other objects of this invention will become clear as the description proceeds.

According to the present invention there is provided: a quantization bit number allocating method for allocating optimum quantization bit numbers to a plurality of frequency subband signals, said method comprising the steps of:

selecting, as a selected subband signal, one of said plurality of frequency subband signals having a maximum ratio of a maximal signal level to a mask level;

allocating to said selected subband signal, as a primary provisional bit number, a maximal quantization bit number allocatable to said selected subband signal;

calculating a primary mask-to-noise ratio of said selected subband signal;

setting a plurality of provisional bit numbers to each frequency subband signal of said plurality of frequency subband signals which has not been selected;

incrementing, one by one from zero, each of the provisional bit numbers respectively set to the remaining subband signals of said plurality of frequency subband signals, meanwhile calculating secondary mask-to-noise ratios for each of the remaining frequency subband signals of said plurality of frequency subband signals each time an associated provisional bit number is incremented by one;

allocating each of said provisional bit numbers of an associated secondary mask-to-noise ratio of said secondary mask-to-noise ratios to said primary mask-to-noise ratio of an associated frequency subband signal of the remaining of said frequency subband signals as a secondary provisional bit number;

summing up said primary and secondary provisional bit numbers into a sum;

comparing said sum with a total of quantization bit numbers allocatable to said frequency subband signals;

using said primary and secondary provisional bit numbers collectively as said optimal quantization bit numbers if said sum does not exceed said total; and if said sum does not exceed said total, performing the following steps of:

calculating a quotient by dividing a numerator difference, said numerator difference being equal to said sum minus said total, by a denominator difference, said denominator difference being equal to a predetermined integer minus the number of said remaining subband signals, excluding at least one particular subband signal from said remaining subband signals;

calculating bit number differences by subtracting an integral part of said quotient from said primary and said secondary provisional bit numbers; and using said bit number differences as said optimal quantization bit numbers if said bit number differences are not negative.

DESCRIPTION OF THE PREFERRED EMBODIMENT

Figure 1:
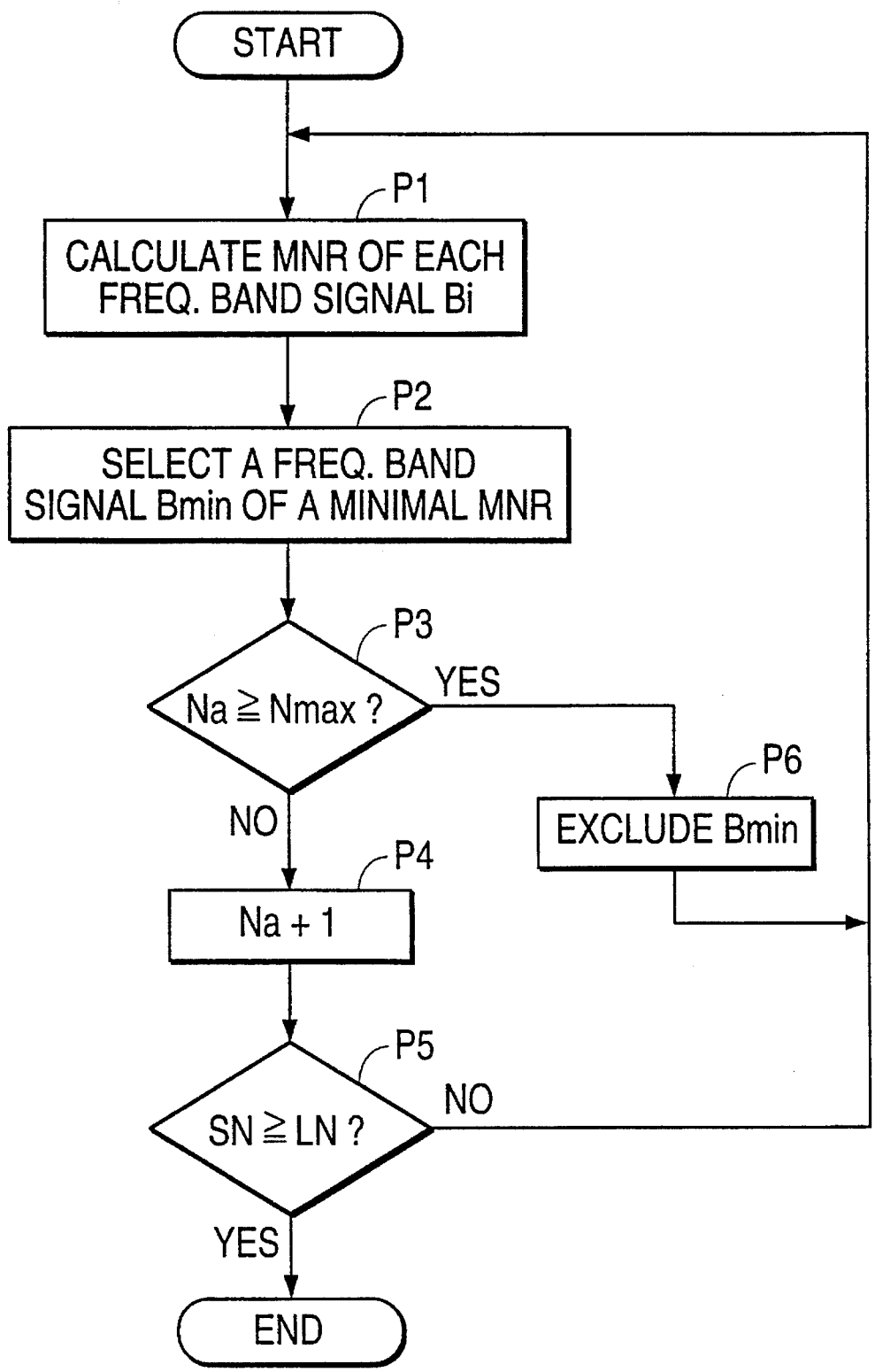
FIG. 1 is a flow chart illustrative of a conventional quantization bit number allocating method.

Referring to FIG. 1, a conventional quantization bit number allocating method will first be described in order to facilitate understanding of the present invention. In general, a quantization bit number allocating method is used for allocating or assigning optimal quantization bit numbers to a plurality of frequency band or subband signals into which an input signal is divided in accordance with frequency bands predetermined by a frequency band of the input signal.

Such an optimal quantization bit number allocation is indispensable for encoding an input signal into an encoded signal for transmission at a certain bit rate to a receiving side through a transmission channel. In the encoded signal, the frequency band signals are represented by quantization bits of the optimal quantization bit numbers. The optimal quantization bit numbers may be equal to zero depending on the frequency band signals.

Typically, the input signal is an audio input signal. It will consequently be assumed that the optimal quantization bit number allocation deals with an audio input signal as the input signal.

For convenience of the description which follows, the frequency band signals will be referred to as the first through I-th frequency band signals and are designated by B(1) to B(I) or collectively by the frequency band signals B with the suffixes omitted, where I represents a predetermined positive integer, such as thirty-two. More particularly, each frequency band signal B(i) is assigned with quantization bits of an optimal quantization bit number specific to the frequency band signal under consideration, where i represents a variable integer which is variable between 1 and I, both inclusive.

In each frequency band, the frequency band signal has a maximal signal level and a mask level which depends on the frequency characteristics of human hearing capabilities. The encoded signal is accompanied by quantization noise which depends on the frequency bands and is herein referred to simply as noise. Before being quantized into the quantization bits of the optimal quantization bit numbers, the frequency band signals are sampled at a preselected sampling rate.

It is possible to preliminarily calculate, as a maximal quantization bit number, a maximum of quantization bit numbers which are individually allocatable to the frequency band signals. Similarly, it is possible to calculate a total of quantization bit numbers allocatable to the frequency band signals. The total depends on a bit rate at which the quantization bits representative of the frequency band signals are transmitted. The total of quantization bit numbers also depends on the sampling rate.

Referring more particularly to FIG. 1, attention is first directed to each frequency band signal B(i). In preparation for a first step P1, a ratio of the maximal signal level to the mask level is calculated as a signal to mask ratio (SMR). A signal to noise ratio (SNR) is also calculated in first step P1. During first step P1, the signal to mask ratio is subtracted from the signal to noise ratio to calculate a mask to noise ratio (MNR). Next, all frequency band signals are taken into consideration as available subband signals.

At a second step P2, a subband signal Bmin is selected from one of the available subband signals that has, as a minimal mask to noise ratio, a minimum of the mask to noise ratios which are successively calculated in connection with the available subband signals. Subsequently, quantization bits of a temporary quantization bit number Na are allocated to the selected subband signal. The temporary quantization bit number Na is reached by incrementing a bit number integer by one (starting from zero) in successive loops in the manner which will shortly be described.

During a third step P3, the temporary quantization bit number Na is compared with a maximal quantization bit number Nmax which is all allocation to the selected subband signal. The maximal quantization bit number Nmax is preliminarily calculated. If the temporary quantization bit number Na is less than the maximal quantization bit number Nmax, the temporary quantization bit number is incremented by one at a fourth step P4 to provide an already allocated bit number. Subsequently, a sum SN of such already allocated bit numbers is calculated with regard to those of the available subband signals including the selected subband signal which are already assigned with the temporary quantization bit numbers Na at the third step P3

During a fifth step P5, the sum SN of already allocated bit numbers is compared with a total LN of quantization bit numbers which is preliminarily calculated in connection with the quantization bit numbers allocatable to the frequency band signals. If the sum SN of already allocated bit numbers does not exceed the total LN quantization bit numbers, a next loop of the first through the fifth steps P1 to P5 is applied to the selected subband signal and to others of the available subband signals. More specifically, the fifth step P5 returns to the first step P1. The selected subband signal and the remaining available subband signals are, however, not different from those used in a preceding loop. Only the third through the fifth steps P3 to P5 are applied in a next loop to such available subband signals.

In this manner, the successive loops are applied to selected subband signal and to the remaining the available subband signals. In the meantime, the temporary quantization bit number Na reaches the maximal quantization bit number Nmax at the third step P3 in one of the successive loops that may be called a particular loop. In this event, the selected subband signal is excluded at a sixth step P6 from the available subband signals to leave the remaining available subband signals as new available subband signals for use in a subsequent loop. There is one less new available subband signals in the subsequent loop than the available subband signals used in the particular loop.

Similar loops are now successively applied to the new available subband signals. More particularly, the mask to noise ratios (MNR) are individually calculated at the first step P1 in connection with the new available subband signals. A different selected subband signal is selected during the second step P2. The third through the fifth steps P3 to P5 are applied to the different selected subband signal and to the remaining new available subband signals. In this manner, the loops are repeated with regard to the new available subband signals with the third step P3 carried out in each of the loops.

The sum of already allocated bit numbers SN eventually reaches the total of quantization bit numbers LN in the fifth step P5. The conventional quantization bit number allocating method now comes to an end.

It is now understood that the conventional quantization bit number allocating method is carried out with the loops iterated a plurality of times which are substantially equal in number to the total of the quantization bit numbers allocatable to the frequency band signals. As a consequence, a long processing time has been necessary to allocate the optimal quantization bit numbers to the frequency band signals and to encode the input signal into the encoded signal.

Figure 2:
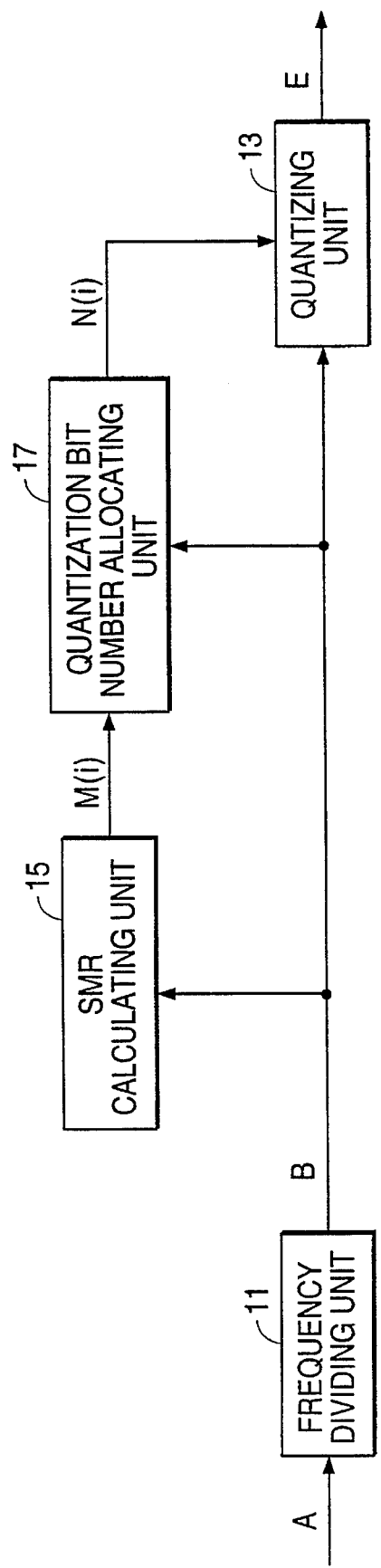
FIG. 2 is a block diagram of a quantization bit number allocating device and a quantizing unit according to an embodiment of the instant invention.

Referring now to FIG. 2, the description will proceed to a quantization bit number allocating device according to a preferred embodiment of this invention. The quantization bit number allocating device is used in a high efficiency encoding device for encoding an audio input signal A into an encoded signal E for transmission at a certain bit rate to a receiving side (not shown) through a transmission channel which is partially depicted as being connected to the encoding device.

In the quantization bit number allocating device, a frequency dividing unit 11 divides the audio input signal A into first through I-th frequency band or subband signals B(1) to B(I) or B (suffixes omitted) in accordance with a plurality of frequency bands predetermined in an input signal frequency band of the input signal A, where I represents a predetermined positive integer, such as thirty-two. The frequency band signals are quantized by a quantizing unit 13 into the encoded signal E.

Before quantization, the quantizing unit 13 samples the frequency band signals into samples at a preselected sampling rate which may be, for example, 48 kHz. Each sample is quantized into quantization bits of an optimal quantization bit number depending on the frequency band signal that is under consideration. Such optimal quantization bit numbers may be equal to zero depending on the frequency band signals. In the encoded signal E, the frequency band signals are represented by the quantization bits of the optimal quantization bit numbers.

In the manner described in conjunction with FIG. 1, each frequency band signal B(i) has a maximal signal level and a mask level, where i represents a variable integer variable between i and I, both inclusive. The encoded signal E is accompanied by quantization noise which depends on the frequency bands and is herein referred to simply as noise.

The quantization bit number allocating device, shown in FIG. 2, comprises a signal to mask ratio calculating unit 15 supplied with the frequency band signals B. This calculating unit 15 has three calculating functions. First, for each frequency band signal B(i) a ratio of the maximal signal level to the mask level, the signal to mask ratio calculating unit 15 calculates a signal to mask ratio (SMR) designated by M(i). In this manner, the signal to mask ratio calculating unit 15 successively calculates the signal to mask ratios as regards the available subband signals described before.

The signal to mask ratio calculating unit 15, as a second calculating function, also serves as a mask to noise ratio (MNR) calculating unit for calculating a mask to noise ratio (MNR) similar to the conventional quantization bit number calculating method. It should be noted in this connection that the mask to noise ratio is used as a reference. The mask to noise ratio calculating unit 15 calculates a signal to noise ratio (SNR) of each frequency band signal as a third calculating function. The mask to noise ratios are successively calculated in connection with the available subband signals and are produced together with the variable integer representation of each of the frequency band signals for use in selecting the mask to noise ratios of the desired available subband signals.

A quantization bit number allocating unit 17 is connected to the signal to mask ratio calculating unit 15 and to the quantizing unit 13 and is supplied with the frequency band signals B. In the manner which will presently be described, the quantization bit number allocating unit 17 calculates optimal quantization bit numbers of the frequency band signals. It is therefore possible to implement the quantization bit number allocating unit 17 with a microprocessor. The optimal quantization bit numbers are used in the quantizing unit 13 in quantizing each sample into quantization bits of a pertinent one of the optimal quantization bit numbers. Each optimal quantization bit number is designated by N(i).

Figure 3:
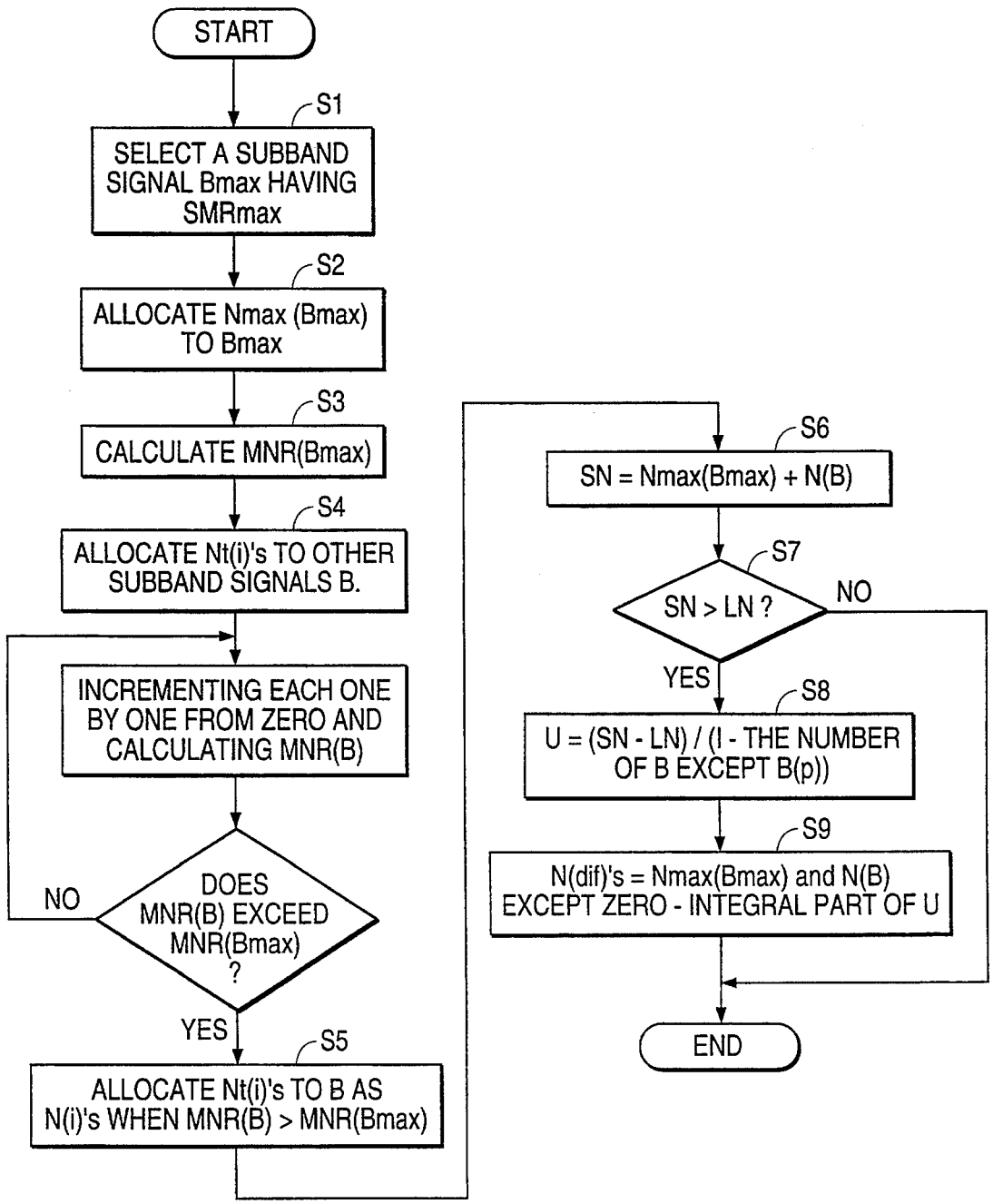
FIG. 3 is a flow chart exemplifying a quantization bit number allocating method for use in the quantization bit number allocating device depicted in FIG. 2.

Referring to FIG. 3 in addition to FIG. 2, use is made in the quantization bit number allocating unit 17 of an improved method of allocating optimal quantization bit numbers to the frequency band signals B. In the manner which will shortly become clear, the improved quantization bit number allocating method avoids the iteration of loops which have been unavoidable in the conventional quantization bit number allocating methods. As a result, the optimal quantization bit numbers are allocated to the frequency hand signals B in a short processing time. The input signal A is encoded into the encoded signal E in a short processing time even if a total number of the optimal quantization bits is increased due to an increased bit rate.

Supplied from the signal to mask ratio calculating unit 15 successively with the signal to mask ratios of the available subband signals, the unit 17 selects, during a first step S1 as a selected subband signal Bmax, one of the available subband signals that has a maximum of the signal to mask ratios as a maximal signal to mask ratio SMRmax. During second step S2, the selected subband signal is provisionally assigned, as a primary provisional bit number, with a maximal quantization bit number Nmax or Nmax(Bmax) which is preliminarily calculated for the quantization bit number allocatable to the selected subband signal.

During third step S3, a primary mask to noise ratio MNR(Bmax) of a selected subband signal is calculated. More particularly, the primary mask to noise ratio is selected from the mask to noise ratios supplied successively from the signal to mask ratio calculating unit 15 by selecting one of such mask to noise ratios that is produced by the signal to mask ratio calculating unit 15 together with the variable integer i which is representative of the selected subband signal.

Subsequently, the remaining available subband signals (other than the selected subband signal) are taken into consideration as other subband signals, which will be designated by B. In describing the fourth and fifth steps S4 and S5, each of the other subband signals will be referred to as an i-th subband signal and will be designated by B(i).

During the fourth step S4 (FIG.3), a "zero" is first temporarily allocated to the i-th subband signal as a zeroth temporary bit number Nt(i)0. With reference to the variable integer i indicative of the i-th subband signal, an i(0)-th secondary mask to noise ratio MNR(i)0 is selected from the mask to noise ratios which are successively supplied from the signal to mask ratio calculating unit 15 (FIG. 2). The i(0)-th secondary mask to noise ratio is compared to the primary mask to noise ratio. If the i(0)-th secondary mask to noise ratio exceeds the primary mask to noise ratio, the i(0)-th temporary quantization bit number is provisionally allocated during the fifth step S5 as an i-th secondary provisional bit number N(i) to the i-th subband signal. If the i(0)-th secondary mask to noise ratio does not exceed the primary mask to noise ratio, the fourth step S4 is again carried out.

A "one" is next temporarily allocated during the fourth step S4 to the i-th subband signal as an i(1)-th temporary quantization bit number Nt(i)1. Similar to the i(0)-th secondary mask to noise ratio, an i(1)-th secondary mask to noise ratio MNR(i)1 is selected and compared to the primary mask to noise ratio. If the i(1)-th secondary mask to noise ratio exceeds the primary mask to noise ratio, the i(1)-th temporary bit number is provisionally allocated during the fifth step S5 to the i-th subband signal as the i-th secondary provisional bit number. If the i(1)-th secondary mask to noise ratio does not exceed the primary mask to noise ratio, the fourth step S4 is carried out again.

in this manner, the temporary quantization bit number of the i-th subband signal is incremented by one (starting from 0) at the fourth step S4 to an i(j)-th temporary quantization bit number Nt(i)j. An i(j)-th secondary mask to noise ratio MNR(i)j will eventually exceed the primary mask to noise ratio. During the fifth step S5, the i(j)-th temporary quantization bit number is provisionally allocated to the i-th subband signal as the i-th secondary provisional bit number.

In other words, temporary quantization bit numbers Nt(i)'s are temporarily allocated during the fourth step S4 to the other subband signals B, respectively, with each temporary quantization bit number consecutively incremented by one (starting, from zero). Meanwhile, secondary mask to noise ratios MNR(B) of the other subband signals are calculated. More specifically, the secondary mask to noise ratios are calculated by selecting those mask to noise ratios which are successively produced by the signal to mask ratio calculating unit 15 which are individually indicated by the variable integers i's indicative of the other subband signals.

During the fifth step S5, the temporary quantization bit numbers are provisionally allocated to the other subband signals as secondary provisional bit numbers N(i)'s or N(B) when the secondary mask to noise ratios individually exceed the primary mask to noise ratio. If the secondary mask to noise ratio exceeds the primary mask to noise ratio in connection with a particular subband signal B(p) of the other subband signal before the zero is incremented to one, namely, when zero is temporarily allocated to the particular subband signal as its temporary bit number, zero is used as the secondary provisional bit number.

Subsequently, at a sixth step S6, the primary and the secondary provisional bit numbers are summed up into a sum SN. During a seventh step S7, the sum SN is compared to a total LN which is preliminarily calculated in connection with the quantization bit numbers allocatable to the frequency band signals. If the sum SN does not exceed the total LN, the primary and the secondary provisional bit numbers are allocated to the selected subband signal and to the other subband signals collectively as the optimal quantization bit numbers. Under these circumstances, the improved quantization bit number allocating method comes to an end.

If the sum SN exceeds the total LN at the seventh step S7, the quantization bit number allocating method must be further stepped as follows to uniformly reduce the primary and the secondary provisional bit numbers with the secondary provisional bit number or numbers of zero excluded. During an eighth step S8, a quotient U is calculated by dividing a numerator difference (SN-LN) by a denominator difference. The numerator difference is calculated by subtracting the total LN from the sum SN. The denominator difference is calculated by subtracting from the predetermined positive integer I the number of the other subband signals except for the particular subband signal or signals.

During a ninth step S9, bit number differences N(dif)'s are calculated by subtracting an integral part of the quotient U from the primary and the secondary privisional bit numbers other than zero. Together with zero allocated already to the particular subband signal or signals, the bit number differences are allocated as the optimal quantization bit numbers to the selected subband signal and to the other subband signals except for the particular subband signal or signals. If none of the bit number differences is negative, the improved quantization bit number allocating method comes to an end.

If one of the bit number differences is negative for at least one specific subband signal of the other subband signals, zero is allocated as at least one optimal quantization bit number to such specific subband signal or signals. The improved quantization bit number allocating method comes to an eventual end.

Reviewing FIGS. 2 and 3, it is now understood that the quantization bit number allocating unit 17 comprises first through eighth arrangements. The first arrangement is depicted as the first step S1 and is for selecting one of the frequency band signals that has a maximum of a ratio of a maximal signal level as a selected subband signal to a mask level. The second arrangement is depicted as the second step S2 and is for allocating to the selected subband signal, as a primary provisional bit number, a maximal quantization bit number allocatable to the selected subband signal. The third arrangement is depicted as the third step S3 and is for calculating a primary mask to noise ratio of the selected subband signal. The fourth arrangement is depicted as the fourth step S4 and is for incrementing by one (starting from zero) each of temporary quantization bit numbers allocated temporarily to other subband signals of the frequency band signals and for calculating secondary mask to noise ratios of the other subband signals each time the temporary quantization bit numbers are incremented by one.

The fifth arrangement is depicted as the fifth step S5 and is for allocating the temporary quantization bit numbers to the other subband signals as secondary provisional bit numbers when the secondary mask to noise ratios individually exceed the primary mask to noise ratio. The sixth arrangement is depicted as the sixth step S6 and is for summing up the primary and the secondary provisional bit numbers into a sum SN. The seventh arrangement is depicted as the seventh step S7 and is for comparing the sum SN to a total LN of quantization bit numbers allocatable to the frequency band signals. The eighth arrangement is depicted also as the seventh step S7 and is for allocating the primary and the secondary provisional bit numbers collectively as the optimal quantization bit numbers to the selected subband signal and to the other subband signals if the sum SN does not exceed the total LN.

In the quantization bit number allocating unit 17, the fifth arrangement allocates a "zero" to at least one particular subband signal of the other subband signals if the secondary mask to noise ratio of the particular subband signal exceeds the primary mask to noise ratio before each of the temporary bit numbers is incremented from "zero" to "one".

If the sum is found to exceed the total by the eighth arrangement, the quantization bit number allocating unit 17 should further comprise the ninth through eleventh arrangements.

The ninth arrangement is depicted as the eighth step S8 and is for calculating a quotient by dividing a numerator difference equal to the sum minus the total by a denominator difference equal to the plurality minus the number of the other subband signals except for the above-mentioned at least one particular subband signal.

The tenth arrangement is depicted as the ninth step S9 and is for calculating bit number differences by subtracting an integral part of the quotient from the primary provisional bit number in connection with the selected subband signal and from the secondary provisional bit numbers in connection with the other subband signals.

The eleventh arrangement is depicted also as the ninth step and is for allocating the bit number differences as the optimal quantization bit numbers to the selected subband signal and to the other subband signals except for the above-mentioned at least one particular subband signal if the bit number differences are not negative.

In the quantization bit number allocating unit 17, the eleventh arrangement allocates a "zero" as one of the optimal quantization bit numbers to at least one of the other subband signals in connection with which one of the bit number differences is negative.

While this invention has thus far been described in specific conjunction with a single preferred method and a sole preferred device according thereto, it will now be readily possible for one skilled in the art to apply this invention to quantization bit number allocation to different frequency band signals derived from a different input signal which may be, for example, a radio frequency signal. It should be noted in this connection that the different input signal is encoded into a different encoded signal and that a receiving side of the different encoded signal preferably has a frequency characteristic which is similar to the frequency characteristics of human hearing capabilities. In such an event, this invention is effective in shortening the processing time of allocation of optimal quantization bit numbers to the different frequency band signals and of encoding of the different input signal into the different encoded signal.

Moreover, it is understood in connection with this invention that the processing time is much reduced as compared with the processing time necessary in the conventional quantization bit number allocating method. According to this invention, the processing time is independent of the total of quantization bit numbers allocatable to the frequency band signals. The processing time may depend only on a maximal temporary quantization bit number allocated to the other subband signals with a relevant one of the secondary mask to noise ratio compared with the primary mask to noise ratio when the temporary bit number is incremented by one.

What is claimed is:

1. A quantization bit number allocating method for allocating optimum quantization bit numbers to a plurality of frequency subband signals, said method comprising the steps of:

selecting, as a selected subband signal, one of said plurality of frequency subband signals having a maximum ratio of a maximal signal level to a mask level;

allocating to said selected subband signal, as a primary provisional bit number, a maximal quantization bit number allocatable to said selected subband signal;

calculating a primary mask-to-noise ratio of said selected subband signal;

setting a provisional bit number to each remaining frequency subband signal of said plurality of frequency subband signals which has not been selected;

incrementing, one by one starting from zero, each of the provisional bit numbers set to said remaining frequency subband signals of said plurality of frequency subband signals, meanwhile calculating secondary mask-to-noise ratios for said remaining frequency subband signals of said plurality of frequency subband signals each time an associated provisional bit number of said provisional bit numbers is incremented by one;

allocating said provisional bit numbers to said frequency subband signals which have not been selected as secondary provisional bit numbers when said secondary mask-to-noise ratios individually exceed said primary mask-to-noise ratio;

summing up said primary and said secondary provisional bit numbers into a sum;

comparing said sum with a total of quantization bit numbers allocatable to said frequency subband signals;

using said primary and said secondary provisional bit numbers collectively as said optimal quantization bit numbers if said sum does not exceed said total; and if said sum does exceed said total, performing the following steps of:

calculating a quotient by dividing a numerator difference, said numerator difference equals to said sum minus said total, by a denominator difference, said denominator difference equals to a predetermined integer minus the number of said remaining frequency subband signals, excluding at least one particular subband signal from said remaining frequency subband signals;

calculating bit number differences by subtracting an integral part of said quotient from said primary and secondary provisional bit numbers; and using said bit number differences as said optimal quantization bit numbers if said bit number differences are not negative.

2. A quantization bit number allocating method as claimed in claim 1, wherein zero is used as one of said optimal quantization bit numbers and is allocated to at least one particular frequency subband signal of said plurality of frequency subband signals if the secondary mask-to-noise ratio associated with said at least one particular frequency subband signal exceeds said primary mask-to-noise ratio before the corresponding provisional bit number is incremented from zero to one.

3. A quantization bit number allocating method as claimed in claim 1, wherein zero is used as at least one of said optimal quantization bit numbers instead of one of said bit number differences that is negative.

4. A quantization bit number allocating device for allocating optimal quantization bit numbers to a plurality of frequency subband signals, said device comprising:

first means for selecting, as a selected subband signal, one of said frequency subband signals that has a maximum ratio of a maximal signal level to a mask level;

second means for allocating to said selected subband signal, as a primary provisional bit number, a maximal quantization bit number allocatable to said selected subband signal;

third means for calculating a primary mask-to-noise ratio of said selected subband signal;

a fourth means for setting a provisional bit number to each remaining frequency subband signal of said plurality of frequency subband signals which has not been selected;

fifth means for incrementing, one by one starting from zero, each of the provisional bit numbers set to the frequency subband signals of said plurality of frequency subband signals which has not been selected, and for meanwhile calculating secondary mask-to-noise ratios for the remaining frequency subband signals of said plurality of frequency subband signals each time an associated provisional bit number of said provisional bit numbers is incremented by one;

sixth means for allocating said provisional bit numbers to said frequency subband signals which have not been selected as secondary provisional bit numbers when said secondary mask-to-noise ratios individually exceed said primary mask-to-noise ratio;

seventh means for summing up said primary and said secondary provisional bit numbers into a sum;

eighth means for comparing said sum with a total of quantization bit numbers allocatable to said frequency subband signals; and ninth means for allocating said primary and said secondary provisional bit numbers collectively as said optimal quantization bit numbers to said selected and said other frequency subband signals if said sum does not exceed said total;

tenth means for calculating a quotient by dividing a numerator difference which equals said sum minus said total by a denominator difference which equals said plurality minus the number of other frequency subband signals, said tenth means only being used when said sum exceeds said total;

eleventh means for calculating bit number differences by subtracting an integer part of said quotient from said primary and secondary provisional bit numbers, said eleventh means only being used when said sum exceeds said total; and twelfth means for allocating said bit number differences as said optimal quantization bit numbers if said bit number differences are not negative, said twelfth means only being used when said sum exceeds said total.

5. A quantization bit number allocating device as claimed in claim 4, wherein said sixth means allocates zero to at least one particular frequency subband signal of said plurality of frequency subband signals if the secondary mask-to-noise ratio associated with said at least one particular frequency subband signal exceeds said primary mask-to-noise ratio before the corresponding provisional bit number is incremented from zero to one.

\* \* \* \* \*